(12) United States Patent
Loughran et al.

(10) Patent No.: US 6,983,188 B2
(45) Date of Patent: Jan. 3, 2006

(54) SCHEDULING SYSTEM

(75) Inventors: Stephen A. Loughran, Corvallis, OR (US); David C Collins, Philomath, OR (US); Shawn D Hunter, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/718,826

(22) Filed: Apr. 16, 2004

(65) Prior Publication Data

US 2005/0234577 A1 Oct. 20, 2005

(51) Int. Cl.
*G06F 19/00* (2006.01)

(52) U.S. Cl. ............... 700/99; 700/16; 705/8
(58) Field of Classification Search ............ 700/99, 700/106, 97, 100–102, 16; 705/8; 358/296, 358/1.1, 1.16; 345/502
See application file for complete search history.

(56) References Cited

U.S. PATENT DOCUMENTS

| | | | |
|---|---|---|---|
| 5,528,375 A | | 6/1996 | Wegeng et al. |
| 5,581,486 A | * | 12/1996 | Terada et al. ............... 702/177 |
| 5,826,236 A | * | 10/1998 | Narimatsu et al. ............. 705/8 |
| 5,898,431 A | * | 4/1999 | Webster et al. ............. 345/841 |
| 5,936,625 A | * | 8/1999 | Kahl et al. ................... 715/775 |
| 6,105,520 A | * | 8/2000 | Frazer et al. ............... 112/117 |
| 6,438,436 B1 | * | 8/2002 | Hohkibara et al. ........... 700/97 |
| 6,560,501 B1 | | 5/2003 | Walser et al. |
| 6,611,275 B1 | * | 8/2003 | Zey et al. ................... 345/752 |
| 2003/0225474 A1 | * | 12/2003 | Mata et al. ................. 700/121 |

FOREIGN PATENT DOCUMENTS

| | | |
|---|---|---|
| JP | 5233208 A2 | 9/1993 |
| JP | 6083646 A2 | 3/1994 |
| JP | 2000155115 | 7/2001 |

OTHER PUBLICATIONS

Halcyon Software Limited product information from website (halcyon-software.com); Features and benefits of Halcyon Job Scheduler; 2003.

MBA, Inc. product information from website (mbainc.com); Information on IJS/400 in article called Hands-Free Job Scheduling—Automated job scheduling is closer than you think; Excerpt from AS/400 Magazine—Feb. 1997.

* cited by examiner

*Primary Examiner*—Kidest Bahta

(57) ABSTRACT

A scheduling system or method with an interface that can provide a queue-list view and a calendar view. In the scheduling of a particular job on a particular machine, characteristics relating to the particular job ("job characteristics") and characteristics relating to the particular machine ("machine characteristics") can be taken into consideration by the scheduling system.

22 Claims, 7 Drawing Sheets

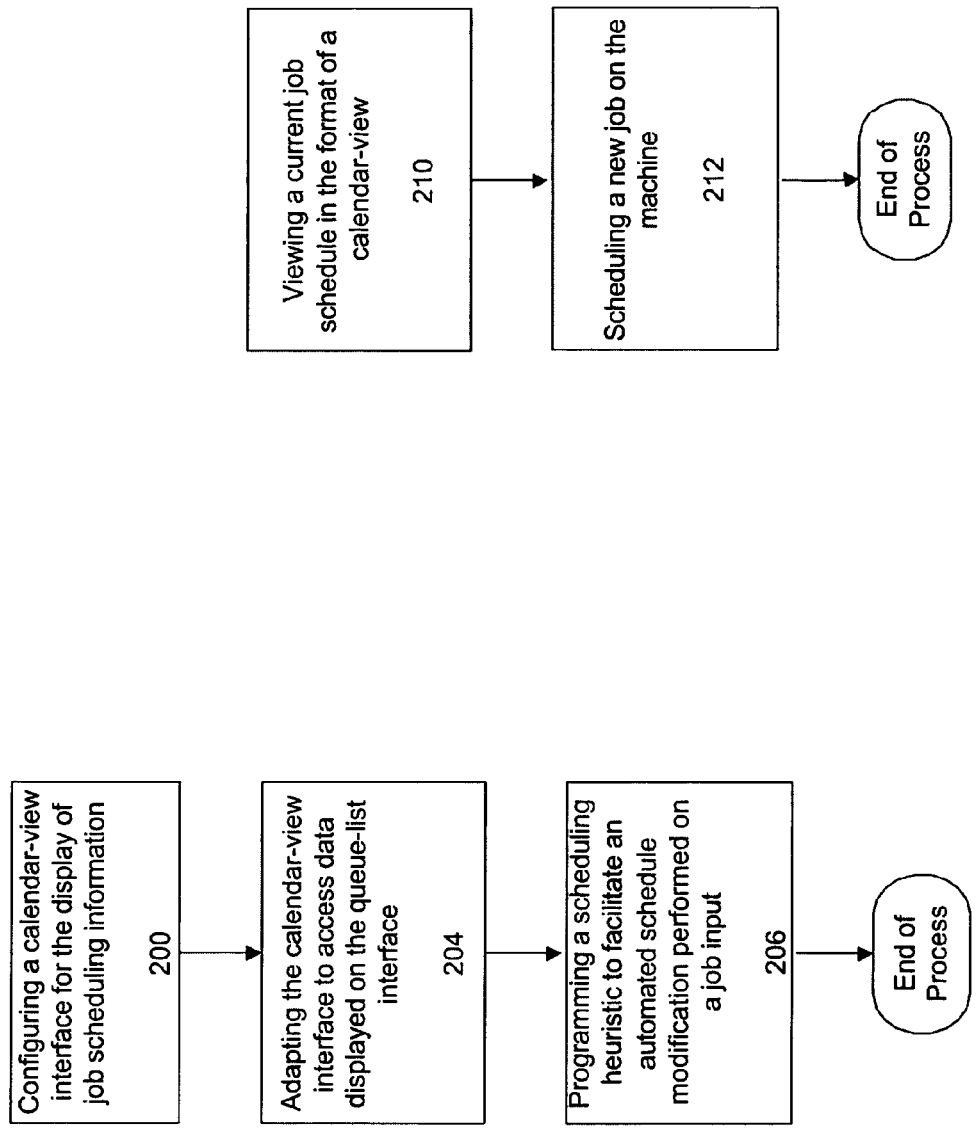

SCHEDULING SYSTEM

BACKGROUND

The scheduling of jobs on a machine such as a fabrication machine and other manufacturing machines and production devices (collectively a "machine") is a complex task. Many different combinations of machine characteristics, job characteristics, and organization characteristics can impact the desirability of a particular scheduling decision and the ease in which human beings interact with the machine and scheduling application.

Different machines can have different: (a) maintenance requirements; (b) production capabilities; and (c) other machine characteristics (collectively "machine characteristics"). If a machine is not properly maintained, it will typically perform in a suboptimal manner that often requires more time and expense to correct than the time and expense necessary for efficient proactive maintenance and management.

Different jobs can have different: (a) quality and quantity of inputs; (b) quality and quantity of outputs; (c) priority values with respect to the organization using the machine; (d) deadlines; (e) lengths of time from beginning to end ("completion times"); and (f) other job characteristics (collectively "job characteristics"). Job characteristics and machine characteristics can have a significant impact on each other, and the scheduling of jobs on a machine.

Some type of human intervention is typically required in the configuring, running, and maintaining of production environment machines, and that human element can have a significant impact on both the maintenance of the machine as well as in how the various jobs scheduled on the machine are managed. Scheduling systems typically schedule jobs using "machine-centric" interfaces rather than "user-centric" interfaces. Thus, machines are often underutilized because the production schedule of the machine is scheduled around the users, instead of having the various users schedule their work around the constraints and limitations of the machine.

Interactions between the user and the machine are often hampered by the machine characteristics, job characteristics, and/or organization characteristics. For example, an operator may not be able to submit a job for the production queue on a machine until after the design of the component is completed and submitted. Moreover, a fabrication machine may require both physical inputs as well as data describing how the physical inputs are to be transformed into physical outputs. This level of detail is not typically conducive to how human beings go about the process of scheduling jobs on various machines. Moreover, the interface of a first-in-first-out ("FIFO") queue of submitted jobs does not facilitate the ability of users to more effectively schedule the jobs for a particular machine or group of machines based on the needs of users and their organizations.

Existing scheduling systems are typically limited to single-view interfaces, such as a traditional linear list of submitted jobs (a "queue-list view" which can also be referred to as a "print queue interface"). By limiting users and operators to particular views of a machine schedule, the ability of users to enhance their efficiency in scheduling jobs and utilizing machines is impeded.

BRIEF DESCRIPTION OF THE DRAWINGS

Some of the embodiments of the present invention will be described in detail, with reference to the following figures:

FIG. 9 is a flow chart illustrating an example of a method for implementing a scheduling system.

FIG. 10 is a flow chart illustrating an example of a method for using a scheduling system.

DETAILED DESCRIPTION

I. Overview and Introduction of Elements

The scheduling of a job on a machine is impacted by many different variables associated with various relevant perspectives. The efficiency and utility of the scheduling system can be enhanced by (1) taking into consideration many or even all of the potentially relevant attributes; and (2) providing many different "views" of a schedule to suit the various contextual needs of users and machines. Attributes relating to users, the organizations associated with users, raw material inputs, the jobs being scheduled, and the machines on which the jobs are being scheduled, can each be given the appropriate cognizance by the scheduling system. Such an abundance of information can provide challenges as to how human beings interact with the scheduling system. To facilitate the ease of use of the scheduling system, the various interfaces incorporated into the scheduling system can provide potentially many different "views" depending on the desired perspective of a particular user or machine at a particular point in time. Different "views" allow the scheduling system to cater to different perspectives and goals by focusing on the information that is desired, while filtering out the information that is not currently of interest. For example, some views such as a calendar views and diary views (collectively "user-centric views") focus on information that relates to how users interact with the scheduling system. Examples of user-centric scheduling factors can include the importance of the particular job, the type of machine operator required to perform a particular job, the ability of users to make future reservations (e.g. future day job schedule), and the ability of one job to "cut in line" in front of another job. In contrast, the scheduling system can also involve machine-centric views that focus exclusively on physical or resource attributes. Examples of machine-centric views can include detailed design information such as a bill-of-materials, a CAD drawing, or some other representation of a design.

Figure 1:
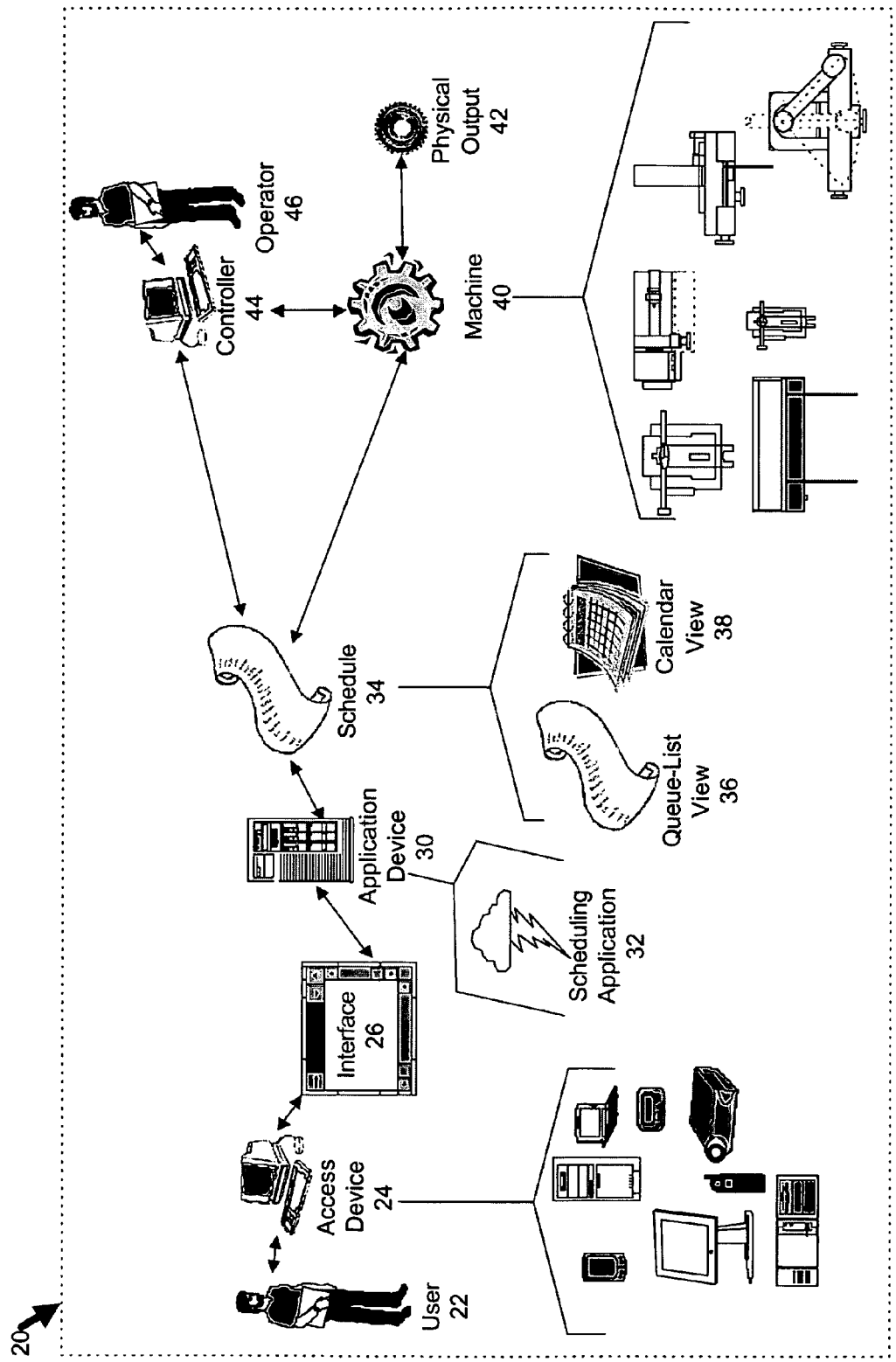
FIG. 1 shows an environmental diagram illustrating an example of some of the elements that can be part of a scheduling system.

FIG. 1 shows an environmental diagram illustrating an example of some of the elements that can be part of a scheduling system (the "system") 20. There are many different potential configurations of the system 20.

A. User

A user 22 is typically a human being. However, in some embodiments, the user 22 may be a robot, an expert system, a neural network, an artificial intelligence device, or some other form of automated system (collectively "intelligence technology"). In embodiments involving a human being as the user 22, the user 22 is a person who is authorized for at least one of the following functions: (a) viewing a schedule 34; (b) creating a schedule 34; (c) modifying a schedule 34; and/or (d) deleting the schedule 34 with respect to a machine 40.

In many embodiments, the user 22 will also be an operator 46 of the machine 40. However, the system 20 can also be implemented in such a way as to make the scheduling and operating functions totally separate and distinct from each other. There is no requirement that the user 22 be an operator 46 of the machine 40 or even that the user 22 has any physical proximity or access to the machine 40. In some embodiments of the system 20, the user 22 can schedule a machine 40 from a remote location such as a different city, country, continent, or planet.

Although only one user 22 is illustrated in the Figure, the system 20 can allow many different users 22 to interact with a single schedule 34 relating to a single machine 40. Conversely, a single user 22 can be responsible for multiple schedules 34 relating to many different machines 40.

The user 22 is typically an employee of the organization owning the machine 40. However, the system 20 is not limited to employee users 22. The system 20 can be flexibly configured to accommodate any third party relationship, such as outsourcing, scheduling consulting, ASP (application service provider), and other arrangements.

The user 22 accesses the system 20 and the schedule 34 through the use of an access device 24. Similarly, the system 20 provides information to the user 22 through the access device 24.

B. Access Device

An access device 24 is any device used by the user 22 to interact with the system 20. The access device 24 is the mechanism by which the user 22 accesses, creates, modifies, or deletes one or more schedules 34 relating to one or more machines 40. In embodiments of the system 20 where the user 22 is also the operator 46 of the machine 40, the access device 24 can be the same device as the controller 44 for the machine 40. In some embodiments, the access device 24 will also be the same device (an application device 30) that houses or hosts a scheduling application 32.

The access device 24 allows the user 22 to interact with and receive information from an interface 26

C. Interface

An interface 26 is the means made available by the access device for allowing the user 22 to interact with the system 20. The interface 26 is also the means by which a user 22 "experiences" the system 20. Common examples of interfaces 26 include operating systems, web browsers, and other types of application software. A single interface 26 can provide multiple views, such as a queue-list view 36 and a calendar view 38, as described below.

Access devices 24 can provide many different ways to interact with the interface 26. In many embodiments, a keyboard is one of the access devices 24 used. In some embodiments, devices such as a mouse or light pen can be used. There is no limit to the number of different mechanisms that can be used by a user 22 to interact with the interface 26. For example, the use of a keyboard to type in data does not prevent a user 22 from also using voice recognition technology to interact with the interface mechanisms.

Many embodiments of the system 20 will color-code certain information as it is displayed on the interface 26 to users. For example, different colors could be used to display a variety of indicators relating to a many different metrics that are potentially useful to users 22, operators 46, and the scheduling application 32 of the system. Examples of potentially relevant metrics include but are not limited to: (a) a variety of "status metrics" identifying in terms of resources and/or time what percentage of the work has been completed and how much work remains yet to be performed (for example, the build status metric could indicate that the build is 50% complete); (b) a variety of predictive "resource consumption metrics" relating the work being performed with respect to physical input constraints (for example, this metric could indicate that currently scheduled parts on the build will consume 35% of the maximum tray capacity); (c) a variety of "operator intervention metrics" predicting the time, duration, and nature of the next required operator 46 intervention (for example, the operator intervention metric may indicate that the next operator intervention will need to occur in 4 hours, and that the intervention will relate to adding input materials); and (d) a variety of "utilization" metrics indicating unused capacity and/or unused resources. Depending on the type of machine 40, different metrics are likely to be useful to operators 46 and users 22. The metrics most likely to be of interest to operators 46 and users 22 should be displayed in the form of "indicators" that correspond to the metrics identified above. For example, a resource availability indicator would perform a function analogous to the fuel gauge of an automobile indicating the degree to which the machine 40 is full or empty with respect to the various physical inputs. Many different metrics can be "translated" from units involving resources to units involving time, and vice versa. In some embodiments of the system 20, users 22 can customize the creation of metrics, and the indicators used to display those metrics.

Color-coded information can also be used with respect to job priority (e.g. a "job importance metric"), the extent to which a machine 40 has unscheduled capacity (e.g. a "machine utilization metric"), a job that will not be completed before a particular deadline (e.g. a "late completion time indicator"), a job reservation that is not associated with a submitted design (e.g. a "design-less reservation"), and/or a tentative reservation.

Interfaces 26 are typically defined or at least configured by the applications providing the interface 26. The features of the interface 26 will thus be typically configured by a scheduling application 32.

D. Application Device

The programming logic that provides the interface 26 resides on an application device 30. The application device 30 can be any computer, computer network configuration, or other device capable of supporting the programming logic needed for the system 20. In many embodiments, the application device 30 can be the same device as the access device 24, the controller 44, or both the access device 24 and the controller 44. In other embodiments, the application device 30 is a separate component, typically some type of application server. The scheduling application 32 resides on the application device 30.

The application device 30 and the scheduling application 32 are the means by which the interface 26 interacts with a schedule 34.

E. Scheduling Application

A scheduling application 32 is the programming logic that the system 20 uses to perform the functionality of the system 20. The scheduling application 32 resides on the application device 30. The scheduling application 32 can be made up of more than one computer program and various code libraries. In some embodiments of the system 20, the scheduling application 32 is hosted by an office workflow system, such as Microsoft Exchange. This can take longer to implement than other embodiments, but it facilitates greater integration with other schedules 34 and other software applications across an entire enterprise. In some embodiments, the scheduling application 32 is custom-created software residing on an application device 30 that is not the controller 44 for the machine. In some embodiments, the controller 44 could host the scheduling application 32, including a web view if desired.

The controller 44 can possess the ability to communicate using various calendar protocols, such as vCalendar or iCalendar. This allows the system 20 to interface with various commercially available calendar applications, using calendar views 38 provided by those applications. Such integrated embodiments can allow the system 20 to infer the availability of users 22 and operators 46 to interact with the machine 40. In some embodiments, appointments, part deadlines, reservations, can be inserted by one user 22 onto the calendars of other users 22 or operators 46. Notifications can be sent to users 22 and operators 46 can access the schedule 34 or be notified of scheduled events (including items scheduled by other users 22 and operators 46) through various access devices 24, including PDAs, cell phones, and other highly portable devices.

It is the scheduling application 32 that controls the interactions between activities relating to the interface 26 and the schedules 34 being processed by the system 20.

F. Schedule

A schedule 34 is list of production and other tasks relating to the machine 40. Maintenance activities, loading activities, and production activities can be represented in the schedule 34. At its most basic level, the schedule 34 is simply a sequence, list, or order of tasks relating to the machine 40. This view of the schedule 34 can be referred to as a "queue-list view" 36. The system 20 also provides a more user friendly view of the system 20 referred to as a "calendar view" 38.

In some embodiments of the system 20, the schedule 34 includes an electronic model or design, such as a CAD (computer aided design) "drawing" that is supplied to a machine 40. Thus, a schedule 34 can also have a design-level view that looks to the individual job or part. In embodiments of the system 20 where the schedule 34 is the means by which a design is communicated to the machine 40, the schedule 34 will typically include all of the information needed for the machine 40 to generate the physical output 42 at the time that the machine 40 begins the particular job. However, it may be possible to modify or complete a design after the machine 40 has begun working on the particular job incorporating the design. Some embodiments of the system 20 may be able to display various images of various views of the design within the calendar view 38 of the schedule 34. Different embodiments of the system 20 can provide for different durations of time within the schedule 34. For example, some schedule 34 may be limited to a few minutes while other schedules 34 may cover decades of time. In many embodiments, the schedule 34 will include a present day job schedule and various future day job schedules.

G. Calendar View

The different configurations and functionality of the calendar view 38 are discussed in greater detail below. In some embodiments, the calendar view 38 and the queue-list view 36 are derived from the same source of data. In other embodiments, they may access different sources of related or mirrored data. The calendar view 38 can include all of the data involved in a queue-list view 36, but the queue-list view 36 will not typically require all of the data fields used to create the calendar view 38.

Many machines 40, including solid freeform fabrication machines use a queue-list view 38, e.g. a simple ordered list of parts to build. The process of scheduling parts to build on a busy machine 40 is often a complex process, requiring the scheduler to take into account unattended overnight and weekend operations, quick daytime runs, organization holidays, the need to refill and clean the machines between jobs, machine maintenance and other variables.

The calendar view 38 assists the user 22 in creating, updating, and otherwise manage the schedule 34.

The calendar view 38 can break down the "to do" list for a particular machine 40 or group of machines 40 in the way that human beings perceive events, in terms of dates and times. The calendar view 38 can be flexible, limiting a "screen" to as focused a time period as a portion of a single day, or providing a more expansive view that includes the entire week, month, season, or even year. The calendar view 38 can also be used to receive user 22 interactions. For example, the user 22 can submit build jobs with a priority value, a deadline, or other information relevant to the scheduling of the build directly by interacting with the calendar view 38. The system 20 can perform automated scheduling using one or more scheduling heuristics, described in greater detail below.

The calendar view 38 can allow users 22 to make "reservations" on the schedule 34 for a machine 40 before a design has been finalized (e.g. a reservation for an incomplete design) and submitted to the machine 40. Machines 40 can be scheduled taking into account machine maintenance, and the filling/refilling of a build tray. Various builds can be scheduled in a "nested" manner.

In some embodiments, the schedule 34 for a machine 40 will include the design being scheduled. In such an embodiment, the schedule 34 is itself transmitted to the machine 40 or the controller 44 for the machine 44. Such a configuration can facilitate a high-degree of automation. In some highly manual embodiments, the schedule 34 is not used to automatically invoke the machine 40, and thus there need not be any communication of the schedule 34 to the controller 44 or the machine 40 because the system 20 relies on a human being to implement the schedule 34. The degree to which schedule-related processing is automated and integrated with other information technology resources can vary widely from embodiment to embodiment of the system 20.

H. Machine

A machine 40 can be any device used to generate an output. In many embodiments, the machine 40 is a "physically transformative machine" that generates a "physical output." Examples of physically transformative machines include any device used to manufacture, fabricate, mill, drill, cut, solder, assemble, or otherwise physically transform an inputted physical resource into a resulting physical output 42. The nature of the output is what defines a machine 40 as a physically transformative machine 40. As discussed below, a physical output 42 is an output that has value due to the physical characteristics of the end result, not the informational content of the end result.

In some embodiments, the machine 40 is a fabricating machine or application, such as a solid freeform fabrication machine. However, as the figure indicates, there are a wide variety of different devices that can be incorporated into the system 20 as physically transformative machines 40 and non-physically transformative machines 40.

I. Physical Output

Output is the end result of the process scheduled on the schedule 34 of the machine 40. In many embodiments of the system 20, the machine 40 is a physically transformative machine 40 and the output is a physical output 42. Physical output 42 is an output that has value due the physical characteristics of the end result, not the informational content of the end result.

Some embodiments of the system 20 do not involve physical outputs 42.

J. Controller

A controller 44 is any type of device such as a console, control panel, access device 24, or any other mechanism by which an operator 46 controls the machine 40. In many embodiments, the controller 44 is the same device as the access device 24, the same device as the application device 30, or the same as both of the devices. The system 20 is highly flexible, and it permits the separation of the scheduling and operations functions.

K. Operator

An operator 46 is typically a human being. However, in some embodiments, the operator 46 may be a robot, an expert system, a neural network, an artificial intelligence device, or some other form of automated system (collectively "intelligence technology").

In many embodiments, the user 22 will also be an operator 46 of the machine 40. However, the system 20 can also be implemented in such a way as to make the scheduling and operating functions totally separate from each other. There is no requirement that the user 22 be an operator 46 of the machine 40 or that the operator 46 have any physical proximity or direct physical access to the machine 40. In some embodiments of the system 20, the user 22 can schedule a machine 40 from a remote location such as a different city, country, or continent. In some embodiments where the operator 46 is or is not the user 22, the operator 46 will be able to view and in some cases modify the schedule from the controller 44. In other embodiments, only the access device 24 can be used to make a change to a schedule 34.

Although only one operator 46 is illustrated in the figure, the system 20 can allow many different operators 46 to interact with a single schedule 34 relating to a single machine 40. Conversely, a single operator 46 can be responsible for multiple schedules 34 relating to many different machines 40.

As discussed above, the operator 46 is typically an employee of the organization owning the machine 40. However, the system 20 is not limited to employee operators 46. The system 20 can be flexibly configured to accommodate any third party relationship, such as outsourcing, consulting, ASP (application service provider), and other arrangements. The system 20 can be configured to accommodate certain relationships, while restricting other relationships. The system 20 can also allow or prohibit certain actions based on authorizations relating to the individual operator 46 or user 22. Authorization determinations can be based on a variety of attributes relating to the individual, including but not limited to, the position within the organization; training, certification, and other indicia of qualifications; organization policies; and other attributes useful to selectively authorize interactions with the system 20.

The operator 46 can access the machine 40 (and in some embodiments, other aspects of the system 20) through the use of the controller 44.

II. Input Data/Output Data

Figure 2:
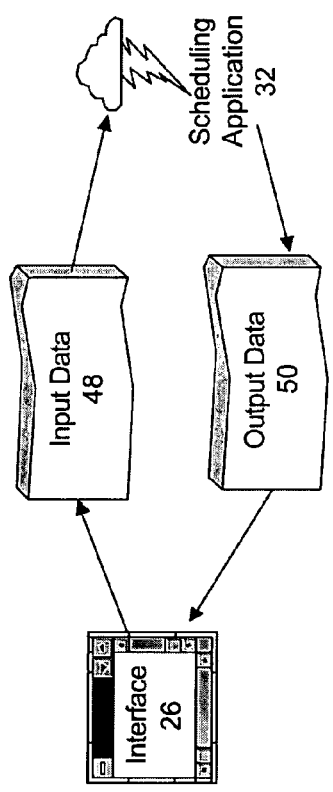
FIG. 2 shows a process flow diagram illustrating an example of the data flow between an interface and a scheduling application.

FIG. 2 shows a process flow diagram illustrating an example of the data flow between an interface 26 and a scheduling application 32. The interface 26 is used to transmit input data 48 to the scheduling application 32. The scheduling application 32 sends output data 50 to the interface 26 where the output data 50 can viewed and potentially responded to or interacted with, by the users 22.

A. Input Data

Input data 48 can include a wide variety of different types of information. The system 20 can be highly flexible and customizable, applying a wide variety of scheduling heuristics to a wide variety of different input data 48 combinations.

1. Machine Characteristics

Machine characteristics are potentially any attribute of the machine 40 that can be relevant for scheduling purposes. Categories of machine characteristics include machine maintenance characteristics and machine capacity characteristics. These categories are described in greater detail below. Machine characteristics can also include the noise generated by a machine 40, smells associated with the use of the machine 40, the hours in which a particular machine 40 is permitted to operate, and any other attributes relating to the machine 40.

2. Job Characteristics

Job characteristics are potentially any attribute relating to the particular job being scheduled on the machine 40 that is relevant for scheduling purposes. Categories of job characteristics can include job input characteristics, job output characteristics, and job schedule characteristics. These categories are described in greater detail below.

3. Organization Characteristics

Organization characteristics are potentially any attribute relating to the organization(s) associated or affiliated with the machine 40, the schedule 34, the user 22, or the operator 46. For example, that fact that a place of business is not operational at a particular time due to a holiday, the business hours set by the organization, or some other scheduling issue that arises due to an organization. Thus, operator availability over a weekend, holiday, weekday, extra-shift (second shift or third shift), and intra-shift break (including lunch) are all examples of organization characteristics relevant to scheduling jobs on machines 40. Organization characteristics are described in greater detail below. Different users 22 and operators 46 can be affiliated with different machines 40, different organizations, and different sub-organizations. The system 20 can take into consideration for scheduling purposes, the pertinent user affiliations and operator affiliations for the available users 22 and operators 46.

4. Situational Characteristics

Situational characteristics are potentially any attribute relating to the context surrounding the use of the machine 40 that is not covered by any of the characteristics discussed above. For example, situational characteristics can include attributes such as the cost of electricity, air conditioning, heating, and other environmental factors which are potentially impacted by the time of day, the day of the week, a day in the month, or some other attribute relating the context in which the machine 40 is used that is not included in the three information types discussed above.

B. Output Data

Output data 50 is the schedule 34, in all of its various views such as the various queue-list views 36, the various calendar views 38, and any other category of views supported by the system 20. Output data 50 can also include information sent to the machine 40 or the controller 44 as a result of processing performed by the scheduling application 32. For example, if a particular job is high priority, particularly quality sensitive, or subject to some other special context, the machine 40 could potentially be configured to automatically adjust to the particular context.

III. Inputs/Outputs for the Machine

Figure 3:
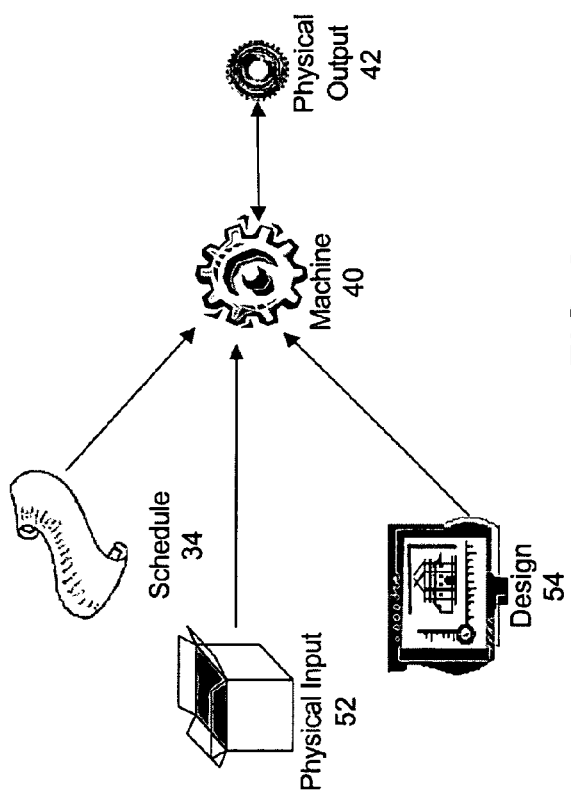
FIG. 3 shows a process flow diagram illustrating an example of various inputs and outputs to a machine using an embodiment of the scheduling system.

FIG. 3 shows an input/output diagram illustrating an example of some of the inputs and outputs that can relate to the machine 40 being scheduled by the scheduling system 20. The machine 40 can use the inputs of one or more schedules 34, one or more physical inputs 52, and one or more designs 54, to generate one or more physical outputs 42.

A. Schedule

In some embodiments of the system 20 ("isolated embodiments"), the scheduling system 20 does not include any machines 40 or any communication with any machines 40. In such an isolated embodiment, the operators 46 enforce the schedule without any automation or communication between the scheduling application 32 (and the schedule 34) and the machine 40. In other embodiments, there is a varying degree of integration, communication, and automation (collectively "integrated embodiments"). In an integrated embodiment, it is typically desirable for the machine 40 to receive the schedule 34 without any human intervention. That is not to say that a human being or other user 22 or operator 46 would not be able to modify the schedule 34 if it was undesirable in some material respect.

In an integrated embodiment, the schedule 34 is typically in a very raw form of data resembling a queue-list view 36. Although the calendar view 38 is intended for the convenience of users 22, the calendar-view 38 could also be sent to the machine 40 for the convenience of the machine's automated processing.

In some embodiments, an electronic representation of the design 54 is also part of the schedule 34.

B. Physical Input

Physical input 52 are the resources and raw materials necessary for the machine 40 to create the physical output 42. In a solid freeform fabrication embodiment of the system 20 and other embodiments of the system 20, the physical input 52 becomes an object built on what is referred to as a build tray. If the system 20 includes fully or partially automated scheduling heuristics, it can be useful to provide more detailed physical input 52 information to the system 20 as input data 48. For example, the scheduling application 32 may be able to generate complex layout and orientation data relating to the design. In other embodiments, a single quantity metric may be the sole input passed to the scheduling application 32.

In a fabrication application embodiment, the scheduling application 32 can spread the building of parts over different building trays to make optimal use of available build capacity, while still meeting the delivery and maintenance timetables laid out by operators 46 or users 22.

In some embodiments of the system 20, the machine 40 requires the loading of build materials as well as support material for the functioning of the machine 40. Such embodiments can be referred to as "support material embodiments." A jetted photopolymer machine 40 by Objet Geometries, Ltd., a company with offices in Mountainside, N.J., is an example of a machine 40 that could be used in a support material embodiment. The adding of build materials and the adding of support materials do not necessarily coincide with each other. Thus, the system 20 may need to schedule both the loading of the build materials and the loading of the support materials. In many embodiments, refill activities typically require the presence of an operator 46.

C. Design

A design 54 is a representation of the design characteristics of the physical output 42 that is to be generated by the machine 40. In many embodiments, the design 54 can be embodied in a CAD (computer aided design) "drawing" that is used by the machine 40, or some other useful formats including but not limited to 'STL' (Sterelithography Format), VRML (Virtual Reality Markup Language) or similar means of defining job geometries or other design characteristics. In some embodiments, the interface 26 allows users 22 to drag-drop a CAD file (or other design 54) into an existing "reservation" on the calendar view 38. In other embodiments, the submission process can be integrated with the CAD application or other forms of design tools (collectively "design tool"). The design tool can provide the user 22 with a choice of providers and/or machines 40 of one or more manufacturing services. The user 22 can then select the providers and/or machines, providing quality, delivery, and other relevant information at the time that the job is submitted.

In some embodiments, users 22 can invoke a "build" function using the design tool, and can be given a choice of providers of the manufacturing service. The system 20 can also be configured to specify quality and delivery options as part of the job submission process.

IV. Scheduling Heuristics

A. Varieties of Input Data

Figure 4:
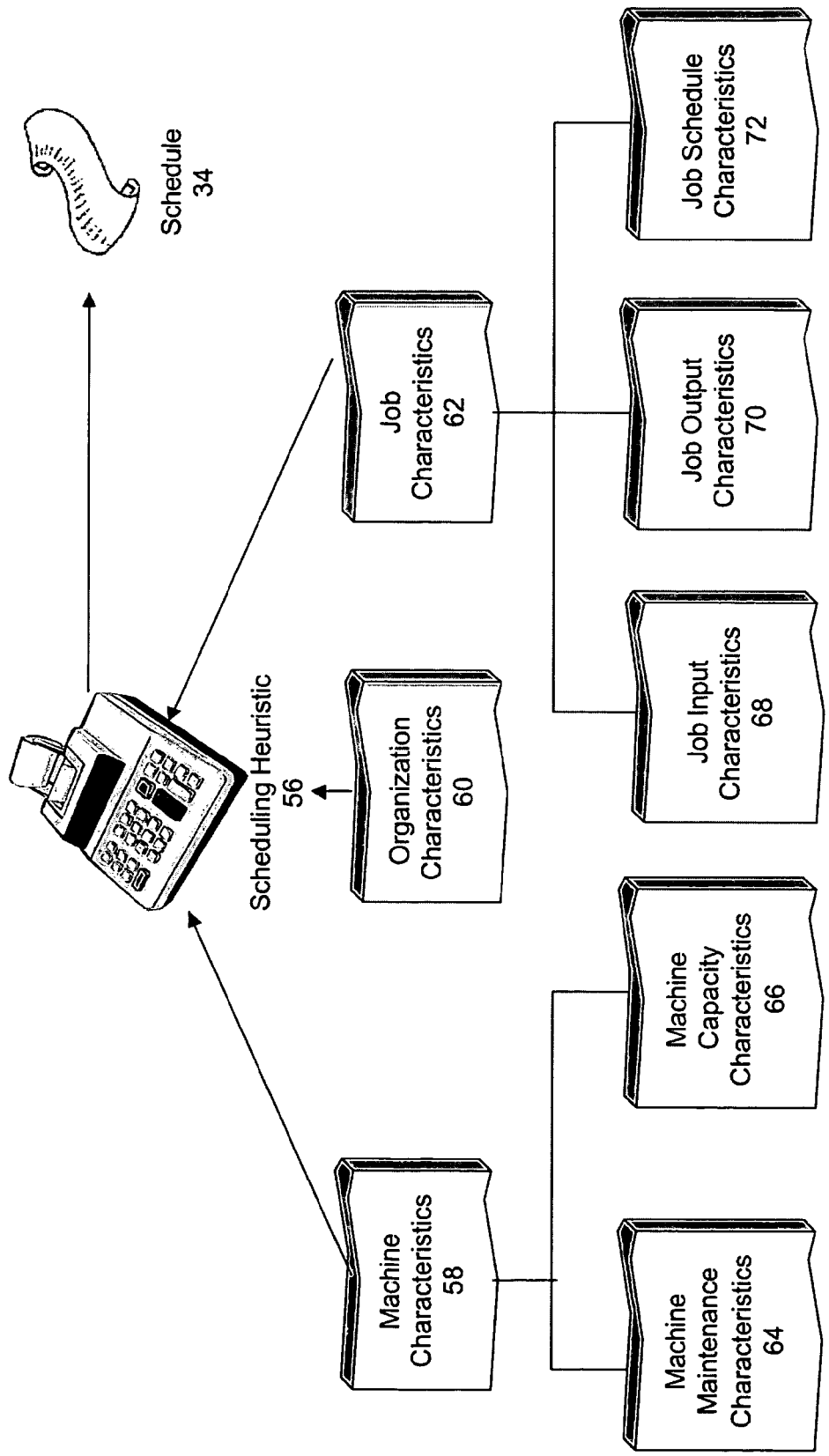
FIG. 4 shows a process flow diagram illustrating an example of the types of information that can be used by a scheduling heuristic to determine a schedule.

FIG. 4 shows a process flow diagram illustrating an example of the types of information that can be used by a scheduling heuristic 56 to determine a schedule 34. Different organizations and users 22 can configure the system 20 to focus on different combinations of input data 48 using a wide variety of different scheduling heuristics 56.

1. Machine Characteristics

As discussed above, machine characteristics 58 can be any information about the machine 40 that can have an impact on the schedule 34 generated by the scheduling heuristic 56.

a. Machine Maintenance Characteristics

Machine maintenance characteristics 64 are any maintenance attributes of a machine 40 that can have an impact on the schedule 34 generated by the scheduling heuristic 56. Examples of machine maintenance characteristics include a maintenance type, a maintenance frequency, a maintenance duration, a maintenance priority, a vendor, a certification, a maintenance status, and any other type of potentially useful machine maintenance characteristic 64. Proper machine maintenance should be enforced by the scheduling system 20. The degree of flexibility that can be incorporated into the scheduling of maintenance can vary from machine 40 to machine 40, and from embodiment to embodiment of the system 20. Machine maintenance characteristics 64 can impact the capacity characteristics associated with the machine 40. For example, if the machine 40 requires an oil change based on the passage of a particular duration of time, or on some other form of usage metric, then the capacity of the machine 40 to work in an uninterrupted manner is impacted.

b. Machine Capacity Characteristics

Machine capacity characteristics 66 can also be referred to as machine performance characteristics because machine capacity characteristics (or simply "capacity characteristics") 66 includes potentially all attributes relating to how a machine 40 performs a job (or is constrained in performing a job) that could impact the schedule 34 for the machine 40. By factoring the performance characteristics of a particular type of machine 40 or even the specific individual machine 40 into the schedule determination process, more accurate and useful schedules 34 can be created.

There are several potentially different capacity characteristics 66 that can impact the performance of various machines 40, and correspondingly, how jobs are scheduled on various machines 40. Different types of machines 40 will involve different types of capacity characteristics 66. Examples of capacity characteristics 66 include: (a) a throughput rate (the rate at which inputs are used up and/or outputs are generated); (b) a raw material capacity (the quantity and volume of build materials 78 that can be loaded into the machine 40 as physical inputs 52); (c) a support material capacity (the quantity and volume of support materials that can be loaded into the machine 40); (d) an output capacity (the quantity and volume of physical outputs 42 that can manufactured onto the output tray or build tray without intervention by the operator 46); (e) a maximum build capacity (the maximum quantity of build materials 78 and the maximum build volume that can be enclosed by the build 74 scheduled on the machine, metrics that may include the constraint of support materials needed for the machine 40 to function, and dimensions and relative travel limitations between the build tray or output tray and the working surface); and (f) any other potentially relevant attribute relating to the performance capacities of the machine 40.

Applying the different types of capacity attributes to the easy to understand context of an automobile, raw material capacity is the "gasoline" that allows the car to move, build capacity relates to the length of the drive (a concept that incorporates the eventual necessity of oil changes and other types of machine maintenance "support materials"), and build tray capacity is the maximum distance that can be traveled before the driver needs to rest. In a manufacturing context, build tray capacity impacts the maximum size of the manufactured product.

With respect to certain machines, such as stereo lithography machines 40, raw material capacity, build volume, and build tray capacity are largely synonymous with each other. For example, with respect to stereo lithography machines 40, the constraints of raw material capacity, job capacity, and build tray capacity are equivalent because the removal of one limitation would not materially alter the overall capacity of the machine 40. Using the everyday example of the family automobile, this is another way of saying that with respect to stereo lithography machines 40, "filling the tank" happens at the same intervals as "reaching intended destinations." With respect to other types of machines 40, one type of capacity attribute is typically more constraining than other types of capacity attributes. The scheduling of machines 40 is typically limited by the most restrictive capacity attribute. For example, in an automobile "example" the raw material attribute is typically more limiting than load capacity because the driver must refill the tank with gas prior to reaching some destinations within a single day's drive, even if the trip started with a full tank of gas.

Different colors can be used by the system 20 to indicate different scheduling issues that involve machine characteristics. Some embodiments of the system 20 can utilize color distinctions to display any type of distinction relating to any type of metric relevant for scheduling purposes. Specific examples of color-coding are discussed above and below.

2. Organization Characteristics

As discussed above, the scheduling heuristic(s) 56 employed by the system 20 can take into consideration factors relating to an organization when generating a schedule 34 from the various input data 48. Many organization characteristics 60 can relate to the availability of the operators 46. Examples of organization-based operator 46 absence include weekends, holidays, optional-third shifts, standard operating hours, and other labor policies. As discussed in greater detail below, "user-centric" job scheduling seeks to schedule work around the schedules of operators 46, instead of scheduling the work of operators 46 around the functioning of the machine(s) 40. With respect to fabrication embodiments of the system 20, it can be extremely beneficial for the system 20 to schedule long jobs just before the operators 46 leave for the day. Depending on the particular type of machine 40, it may be possible for the machine 40 to run all night without any user 22 or operator 46 interactions.

3. Job Characteristics

Job characteristics 62 are attributes relating to the job(s) being scheduled on the machine 40. In many embodiments, the scheduling heuristics 56 will focus primarily on job characteristics 56. There are many different categories of job characteristics 62 that can be used by the scheduling heuristics 56.

a. Job Input Characteristics

Job input characteristics 68 are attributes relating to inputs loaded into the machine 40 that allow the machine 40 to generate the desired physical output 42. Examples of job input characteristics can include the types of resources being inputted, the quantity of materials being inputted, the design 54 used to create the physical output 42, and any other potentially relevant characteristic relating to the inputs for the machine 40. In some embodiments, job input characteristics can include both build materials and support materials and may relate to a build volume required to complete the job. In other embodiments, support materials are more closely related to the machine 40, and are relatively independent of the particular job being performed. In highly automated and integrated environments, a particular raw material need for input may be rare and unavailable until a certain date. By identifying the input type, the system 20 could then know not to schedule that particular job until after the resource had arrived.

b. Job Output Characteristics

Job output characteristics 70 are attributes relating to the desired physical outputs 42 generated by the machine 40 in performing the job. Examples of job output characteristics 70 can include output type and output quantity. In some highly sophisticated embodiments of the system, job output characteristics can include various quality and deviation metrics comparing the physical outputs 42 with the design 54. In such an embodiment, an unsatisfactory physical output 42 can result in the automatic rescheduling of the job at a time when the machine 40 is "at its best" or after human beings have had a chance to enhance the quality of the machine 40 with respect to the particular job.

c. Job Scheduling Characteristics

Job scheduling characteristics 72 are attributes relating to the timing of the job. Examples of job scheduling characteristics 70 include a priority value, a deadline (e.g. a "must complete by" date/time stamp), a load time, a start time, a duration, a completion time, or any other attribute relating to the timing of the job that might be relevant for scheduling purposes.

B. Varieties of Heuristic Approaches

There are many different approaches or intuitions on job scheduling that can be incorporated into one or more of the scheduling heuristics 56 used by the system 20. Such heuristics can vary widely with regards to the amount of input data 48 that is looked at, and the degree of human intervention with respect to the creation of the schedules themselves. In some embodiments of the system 20, users 22 input the various scheduling rules that make up the heuristics. In some embodiments, the system 20 itself prompts users 22 with various questions and uses the answers to create the scheduling heuristics 56 applied by the system 20. There are many different ways in which various scheduling rules can be implemented into the system 20. In some embodiments, various scheduling rules can be created by users 22 through the access device 22. In other embodiments, scheduling rules are predefined, and cannot be modified through the interface 26 for the scheduling application 32.

Some embodiments of the system 20 will not incorporate any of the following approaches into the scheduling heuristic 56. Other embodiments may incorporate one or more the following approaches into one or more scheduling heuristics 56.

1. Minimize the Need for Operators when Operators are not Available

Jobs and builds should be scheduled in such as manner so that activities and events requiring the presence of the operator 46 occur when the operator 46 is present. For example, jobs and builds can be scheduled in such a manner so that the loading of build materials or the loading of support materials occurs when one or more operators 46 are available to perform the activity. The relative lengths of the jobs and/or builds can be a useful variable in minimizing the need for operators 46 when operators 46 are not available. The relative capacity of the build tray for the particular machine 40 with respect to the build size for the particular machine 40 is also typically an important constraint and input variable.

One potentially useful scheduling heuristic 56 is to run large jobs and/or builds overnight, on weekends, or other times when operators 46 are not available. This is particularly beneficial when dealing with machines 40 that do not require substantial supervision when operating. For example, a freeform fabrication machine could be loaded up on Friday at 5 p.m. with a job or build that would run for 48 hours, or more, uninterrupted.

In other embodiments, it will often be desirable to combine or "nest" one or more short jobs with one long job into a single build. The nesting of relatively short jobs with a large job can often be used by the system 20 to adjust when operator activities, such as the loading of build materials or support materials, becomes necessary. For example, if the large job unaccompanied by any small jobs would be completed in the middle of lunch hour, the addition of a short job might be able to push back the need for an operator 46 into the early afternoon. Different embodiments of the system 20 can utilize one or more different heuristics for identifying "long jobs" and "short jobs." In some embodiments, the system 20 compares the various jobs to be nested together, and identifies jobs that are relatively longer and relatively shorter with respect to other jobs in the same build. In other embodiments, the system 20 may compare a particular job to a job of average length (a statistic that includes jobs outside of the build being scheduled), identifying certain jobs as "longer-than-average jobs" and "shorter-than-average jobs." In certain embodiments, the system 20 may utilize both forms of comparisons in addition to other forms of comparison.

2. Maximize the Utility of Operators when they are Available.

A corollary to the above heuristic is to purposely induce operator activities when operators 46 are available. In some embodiments, this principle would result in the running of short builds during the day, timing them to finish before the night's large builds and/or jobs are started. Similarly, spare time can be filled with low priority items. The scheduling heuristics can schedule jobs and builds in such a fashion as to take into consideration the most limiting constraint, which is typically the availability of the operator 46.

3. Reservations to Ensure Space in Advance

Some scheduling heuristics 56 will include the functionality of reservations. A "reservation" allows a user 22 to establish a spot in line for a build or job even if the job and/or build are not ready to be submitted. Different priority values can be associated with different reservations. Priority values can be limited by a maximum priority value that is associated with the position or title of the particular user 22. Reservations can be color coded on the interface 26. For example, different colors could be used to represent a reservation that: (a) may or may not need to be fulfilled (a "tentative reservation"); (b) is associated with a design that is still being created (an "unfinished design reservation"); (c) will not be completed before the deadline; and/or (d) is associated with various priority values such as high-priority reservations and low-priority reservations.

In some embodiments, regardless of any priority values, only the person booking the reservation can submit a job to be included within particular reservation time. After the person making the reservation completes their submission, the system 20 would then be free to make subsequent scheduling enhancements so long as the job reservation was not modified. One such enhancement mechanism is the process of "nesting" parts.

Various optimization heuristics can be performed before the reservation is associated with critical job heuristics. Moreover, in some embodiments of the system 20, the system 20 can be configured to query the user 22 who submitted the particular job or reservation just prior to the job being performed by the machine 40. In such an embodiment, the system 20 can be configured to require that the user 22 submit the information necessary for the completion of the job, or else the system 20 can automatically cancel the reservation if the deadline for submission was missed by the user 22 or was not otherwise in the possession of the system 20.

4. "Nesting" Jobs Together can Save Aggregate Time

Some embodiments of the system 20 will allow for the "nesting" of parts (e.g. jobs) to make larger builds. Nesting is the process of putting two or more jobs as part of the same build from the same build tray. This may take longer than the time to build either individual part (e.g. job), but less time than it takes to build the parts as two separate builds. By allowing the creation of longer builds, "nesting" functionality can assist users 22 in scheduling a large build before the operators 46 leave for the day. There are many different nesting heuristics that can be incorporated into the system 20. Nesting can also be referred to as merging. One advantage of the system 20 is that there is no penalty for nesting parts that better utilize "down time." For example, if users 22 and operators 46 report for work at 6:30 a.m., then there should be no penalty for nesting which results in the 6 a.m. completion time for a job that would otherwise be completed at 5 a.m.

Nesting can be particularly important in support material embodiments of the system 20 or in embodiments where the capacity of the build materials is more likely to be a limiting constraint. Such embodiments typically involve the additional operator 46 activity of loading the physical inputs 52, such as build materials, support materials, binders, and other forms of consumables. In the example of a system 20 scheduling jobs on the jetted photopolymer machine 40 by Objet Geometries, Ltd., the operator typically adds build material and support material on a relatively frequent basis (approximately 1500 cc containers vs. a possible build volume that could approach 10,000 cc). In such an embodiment, 100% of the build material and support material are jetted onto the build tray during the build.

In nesting jobs, it is important for the system 20 to keep in mind the relevant bottleneck characteristics. For example, in an automobile example, gas tanks are small compared to the distance the driver and car are typically capable of going.

In a powder-based machine 40 embodiment of the system 20, the machine 40 jets a binder fluid into a powder bed. In this case, the powder, the binder fluid, and a print head servicing fluid would be the consumables of interest that could limit the available build time before the next operator 46 intervention. Regardless of the particular type of machine 40, it can be desirable to refill or restock more types of physical inputs 52 than merely the particular physical input 52 that has run out. The goal of the system 20 is to schedule human interventions in the manufacturing process so that such interventions happen when operators 46 are available. Sometimes, depending on the operator availability, this will involve delaying the adding of physical inputs 52 until the last possible moment, while in other contexts, it could involve refilling all physical inputs 52 with each and every "interruption" in the schedule.

The system 20 can schedule jobs taking into account all activities requiring operators 46, regardless of what type of event the build intervention- limiter might be.

As discussed above, one goal of the various scheduling heuristics can be to avoid scheduling operator 46 activities when no operator 46 will be available to perform those activities.

5. Pay Attention to Refills and Throughput

A calendar view 38 would allow users 22 to manually enter refill times, times at which a user 22 or operator 46 may attend the machine 40, and other information that can be useful to know. Refill timing with respect to a fabrication machine 40 is based on machine capacities, the particular process, and build volume which is also highly dependent on the part geometry rather than just the actual size of the parts. Thus, either the calendar view 38 or the queue-list view 36 can communicate suggested times for loading, refilling, or otherwise providing the consumables and other input materials 52 for the machine 40. Those "suggestions" can be based on the actual submitted and scheduled jobs, and based on unattended machine 40 operation.

6. A more Restrictive Reservation Scheme

Instead of allowing reservations to block out portions of time without a submitted design, the system 20 can be configured to allow the user 22 to submit a build envelope (such as a 10 cm×13 cm×5 cm) or even a "draft" part subject to change, but only with fixed parameters regarding that change. Other users 22 could utilize the build tray outside of the previously fixed parameters. In certain contexts, other users 22 may be allowed to submit additional jobs even after the beginning of the build.

For example, in some solid freeform fabrication ("SFF") embodiments of the system 20, the entire bin can be filled with support material to facilitate adding new parts to a build 74 that is already in the process of being manufactured. If the layers below a part have the requisite support structure, new parts can potentially be submitted mid-build that relate to those layers. Thus, in a powder-based SFF embodiment of the system 20 (including but not limited to 3D Printing or Laser Sintering), parts can be submitted mid-build.

7. Scheduling by a Deadline Instead of a Start Time

The system 20 can be configured so that the user 22 submitting the job includes a "must be finished" time (e.g. a deadline). If the scheduling application 32 cannot schedule a job so that the job is completed by the deadline, various warnings can be given to the user 22 through the interface 26. This can encourage the user 22 to either seek another machine 40, or to have the priority value (which can also be referred to as a priority metric) changed for the particular build or job.

8. Separating Large Builds into Smaller Builds

With respect to the creation of multiple physical outputs 42 from the same design 54 (the making of several "copies"), it may not be possible to schedule all of such builds as a large build at the end of the day. It may be advantageous to split an otherwise large build into several small builds that are scheduled at various gaps in the schedule 34 during the day. This can be particularly effective when combined with the "nesting" jobs together, as described above.

9. Adding an Unrelated Part to an Existing Build

The calendar view 38 can be configured to display the largest dimension of a part which can be added to the build bin without negatively impacting the completion time of the currently scheduled build. Typically, adding a part will slow the build by some amount, extending the completion by time some percentage of time. The system 20 can respond to the proposed adding of unrelated parts by: (a) providing the appropriate warning (such as a color coded message) if the addition would cause one or more jobs to be completed past a deadline; and (b) provide the appropriate warning if the additional job would delay the overall build by a percentage value that exceeds some time of predefined threshold value. This functionality allows users 22 to know what parts can be added to an existing build or reservation on the system 20. If deadlines are still met, and operator 46 interventions occur during periods of time when operators 46 are available, adding additional jobs 76 to a build 74 can be an excellent way to "squeeze out" additional efficiencies from the machine 40.

10. Schedule Around Refill Times

Just as machine maintenance should be factored into the schedule 34 generated by the scheduling application 32, the process of loading up the machine with respect to the particular job or build should also be taken into consideration. For some fabrication systems, it is desirable to avoid scheduling a refill except between builds on the machine 40. In some fabrication system embodiments, interrupted or paused builds may create damaged parts, including: watermarks, rough edges, discontinuities, and disconnected parts. In other fabrication systems 20, it may be necessary to add or refill required build materials during a build due to a build volume larger than the raw material capacity (which can also be referred to as a fill volume) of the machine 40. This may be particularly true for long builds that may be scheduled to run largely when the operator 46 will not be present. In this case machine scheduling could adjust build start time or run rate such that a required mid-build refill is delayed until the operator 46 is present, thus avoiding the types of part damage that may result from interrupted builds, as described above.

The scheduling concepts discussed above can be given different "weights" by different embodiments and configurations of the system 20. The variable of machine capacity (e.g. typically the build materials capacity of the machine) in relation to the typical build requirements for the particular machine 40 machine constraints is often an important variable for scheduling purposes. For example, refill times or load times require greater consideration where the build size exceeds machine capacities for the corresponding raw materials required. This is another way of saying that refill times or load times require greater consideration where the build materials capacity of the machine 40 is less than the build material volume required for the time period in which the operator 46 is absent. While in some cases (such as stereo lithography embodiments) the build tray volume=maximum load volume=maximum job (output object) size, in other cases, build material could added from a separate location in discreet amounts in a layer-by-layer build process to the build tray. In the latter of these cases the raw material capacities are not connected to the capacity of the build tray volume. The system 20 can incorporate information about different loading techniques, as well as the different capacity attributes associated with those techniques, in generating job schedules for the machine. Different machines 40 will involve different combinations of constraints and trade-offs, and the system 20 can be configured to effectively deal with those specific contexts.

For embodiments of the system 20 where machine capacity is a significant constraint, a visual indicator on the calendar view 38 can be used to display a prediction of the next refill time or load time (this can include support materials in a support materials embodiment). This information can be used by the scheduling heuristics, as well as operators 46 and users 22. The case where nesting in an overnight build would require a refill prior to presence of an operator can then be identified, and correspondingly rejected or modified. In some embodiments, refill activities can be the most common demand for the participation and presence of the operator 46. The visual indicator can include a color component, with different colors indicating different constraints and limiting factors with respect to the current schedule. For example, yellow might be used to indicate that a refill will be needed before an operator is available while blue is used to indicate the machine 40 has unscheduled time.

C. Data Hierarchy of a Schedule

Figure 5:
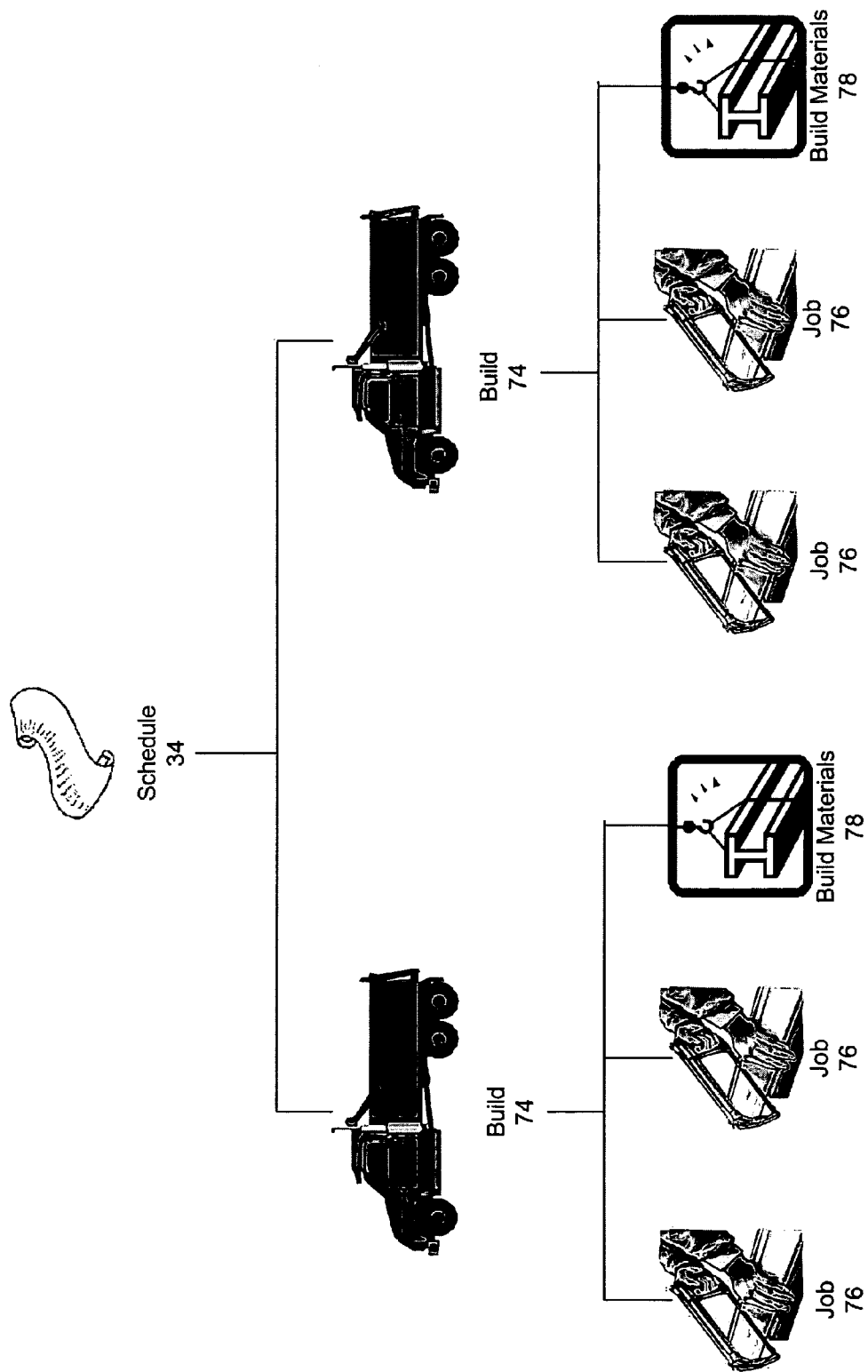
FIG. 5 is a data hierarchy diagram illustrating an example of the relationship between a schedule, one or more builds, and one or more jobs.

FIG. 5 is a data hierarchy diagram illustrating an example of the relationship between a schedule 34, one or more builds 74, and one or more jobs 76.

1. Schedules

The schedule 34 is at the top of the data hierarchy diagram. A single schedule 34 can cover a single machine 40, or many different machines 40. If the user's organization implements enterprise-wide data mining applications to track machines 40, users 22, and other resources, the scheduling system 20 could be integrated into the appropriate asset management and/or data mining applications. In such an environment, a single aggregated schedule 34 (made up of various individual sub-schedules 34) could be created for all of the machines 40 that are part of the scheduling system 20. The scheduling heuristics 56 can include machine selection if there are multiple machines 40 of the same type or function.

2. Builds

Builds 74 are groups of jobs 76 being performed at the same time. In some embodiments of the system 20, only a single job 76 is scheduled at a time. In such an embodiment, a build 74 can only include one job 76. However, as discussed above regarding "nesting," it can be beneficial to produce multiple jobs 76 (which may or may not be for a related purpose) at the same time. A build 74 can have any number of different jobs 76. Builds 74 are a useful and aggregated "unit of work" in the scheduling process. Without multiple-job builds 74, the ability of the scheduling heuristics 56 to optimize the schedule 34 can be impaired.

As seen in the figure, a build 74 can have multiple jobs 76, while utilizing only a single load of build materials 78. In some embodiments of the system 20, the machine 40 requires both "build materials" as well as "support materials" as physical inputs. In a fabrication application embodiment of the system 20, the build materials 78 are placed in what is called a build tray or incorporated into a material feed system allowing for addition to the build tray when needed.

In a solid freeform fabrication machine embodiment of the system 20, builds typically take from between 4 and 48 hours. The build time is typically not a function of the number of parts on the tray, but is instead a function of material consumption and the height of the highest part of the tray.

3. Jobs

A job 76 is the unit of work that a user 22 sends to the scheduling application 32. Jobs 76 do not take into consideration their potential compatibilities with other jobs. Job characteristics 62 are an important input for the scheduling heuristics 56, and the job 76 can be a fundamental building block of the scheduling system 20. A single design 54 submitted to the machine is a job 76.

4. Build Materials

Build materials 78 are made up of the physical inputs 52 needed for the machine 40 to produce all of the jobs 76 in the build 74. Build material information can be an important input for the scheduling heuristics 56. Build materials 78 can include both raw materials (e.g. "build materials") as well as support materials necessary for the functioning of the machine 40. Build material requirements may be highly dependant on job characteristics.

V. Exemplary Interface View

Figure 6:
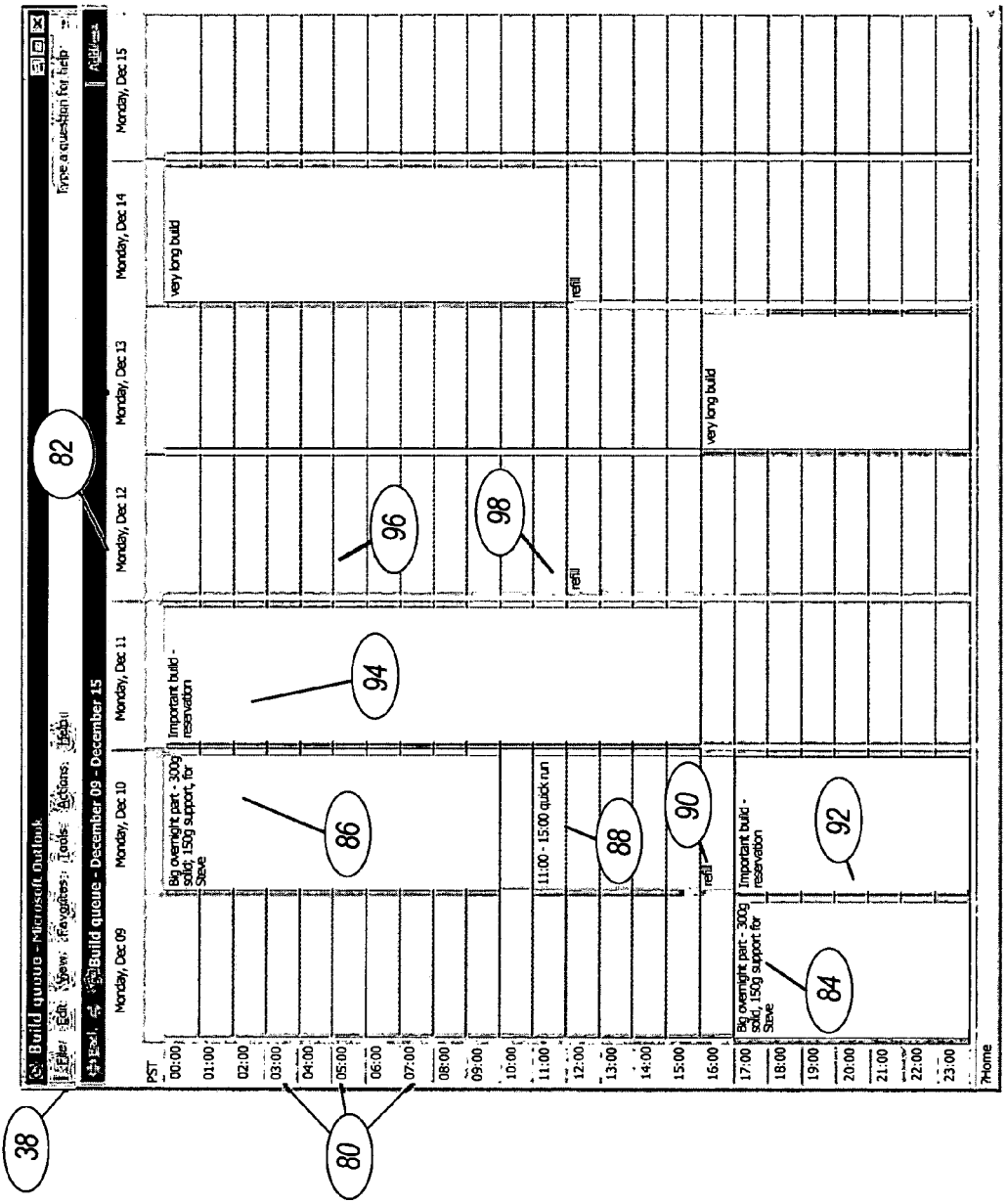
FIG. 6 is a diagram illustrating an example of a calendar interface used by a scheduling system.

FIG. 6 is a diagram illustrating an example of a calendar view 38 used by a scheduling system 20. A wide variety of different calendars views 38 can be incorporated into the system 20. The span of days/time that can be seen on the calendar view 38 can be set by the user 22. In some embodiments, users 22 may want to limit themselves to a portion of an individual day, while in other embodiments, a week-long or even month-long view may be desirable. The time increments 80 are displayed on the left side of the screen with the day increments 82 being displayed at the top of the screen. This arrangement can vary in different embodiments of the system 20.

Several job/build entries are disclosed in FIG. 6 as examples of entries in a schedule 34. The build at 84 is a large job that is prudently scheduled for overnight processing. The job at 84 is not completed until the next day at 86.

The color used to make the diary entry can be contrasted with the important build reservation at 92 and 94, and the refill scheduled at 90.

Different colors can also be used to differentiate between open time during the day at 98 and open time that is not during business hours at 96.

Users 22 can toggle between the calendar view 38 disclosed in FIG. 6 and a conventional queue-list view 36 with a mouse click on the interface 26 or by some other means.

In some embodiments, the calendar-view 38 includes a dynamic capacity visualization so that every potential opportunity to "squeeze" in a job 76 is recognized by the users 22.

VI. Subsystem-Level Views

Figure 7:
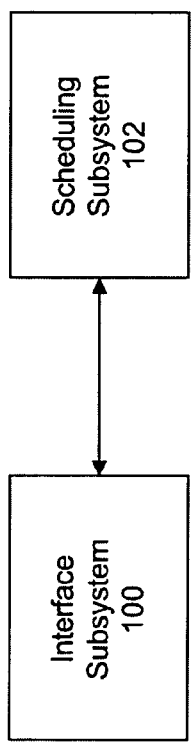
FIG. 7 is block diagram illustrating an example of a subsystem-level view of a scheduling system.

FIG. 7 is block diagram illustrating an example of a subsystem-level view of a scheduling system 20. The system 20 can be embodied in a wide variety of different subsystem configurations. The functioning of the system 20 can be explained as interactions between various subsystems.

A. Interface Subsystem

An interface subsystem 100 can include the interface 26 as well as the views provided by the interface 26, such as the queue-list view 36 and the calendar view 38. Other additional views can also be included. The interface subsystem 100 handles all interactions between the user 22 and the schedule 34.

B. Scheduling Subsystem

A scheduling subsystem 102 can include the actual schedule 34 as well as the various scheduling heuristics 56. The scheduling subsystem 102 is responsible for generating a schedule 34 from the information received through the interface subsystem 100. The scheduling subsystem 102 may or may not communicate directly with the machine 40 and controller 44.

Figure 8:
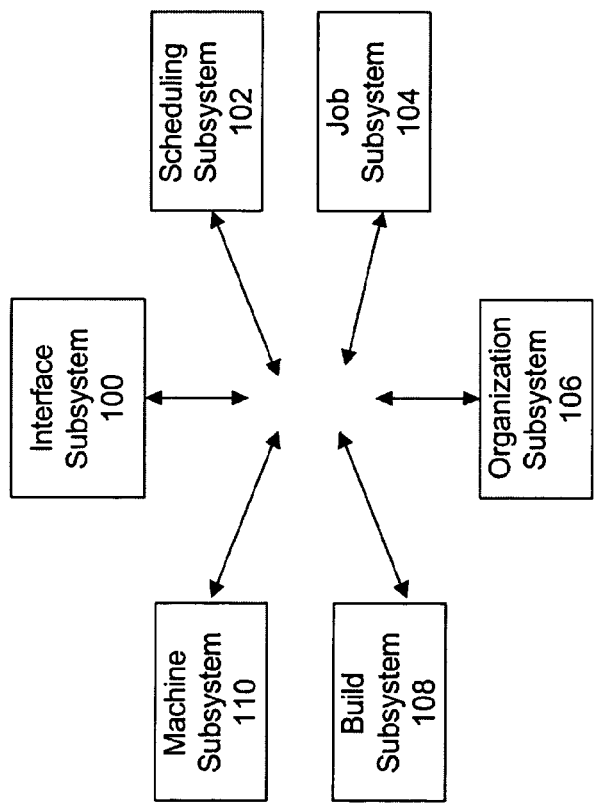
FIG. 8 is a block diagram illustrating an example of a subsystem-level view of a scheduling system.

FIG. 8 is a block diagram illustrating an example of a subsystem-level view of a scheduling system 20. It includes the two subsystems identified above, in addition to other subsystems.

C. Job Subsystem

A job subsystem 104 can be responsible for storing, creating, updating, deleting, and managing all job characteristics 62. As discussed above job characteristics 62 can be an important input for the scheduling heuristics 56. Jobs 76 are typically the fundamental building block of the scheduling system 20. More than one job 76 can be scheduled for a particular block of time, but one does not typically schedule only part of a job 76. The job subsystem 104 can interact with the interface subsystem 100 to encapsulate complexity relating to the job characteristics 62 that may not be of interest to the casual viewer of the calendar view 38.

D. Organization Subsystem

An organization subsystem 106 is responsible for creating, updating, storing, deleting, and other managing organization characteristics 60. The organization subsystem 106 can be fully integrated with the other business systems used by the user's organization. Thus, the organization subsystem 106 could automatically provide the scheduling heuristics 56 with information about company holidays and other practices and policies.

E. Build Subsystem

A build subsystem 108 can be used to organize various builds 74 from multiple jobs 76. The build subsystem 108 can thus interact closely with the scheduling subsystem 102 and the jobs subsystem 104, as well as any other subsystem of the system 20. The build subsystem 108 can be instrumental in identifying opportunities for nested or merged builds, as discussed in greater detail above.

As discussed above, builds 74 can be an important "unit of work" for scheduling purposes. In some embodiments, a single build 74 will include multiple jobs. In other embodiments, due to size or other limitations, a single job 76 may require multiple builds 74 and the multiple loading of physical inputs 52. The determination of whether a single job 76 requires more than one build 74 or more than one loading of build materials 78 will depend in large degree as to the build tray capacity and build materials 78 capacity of the machine 40, important machine characteristics 58.

F. Machine Subsystem

A machine subsystem 110 can be used to create, update, delete, store, and otherwise manage machine characteristics 58. In some embodiments the machine subsystem 110 is integrated with self-diagnostic capabilities of the machine 40 so that maintenance and other machine related activities can be scheduled on the basis of the current condition of the machine.

VII. Process-flow Views

A. Method for Implementing

FIG. 9 is a flow chart illustrating an example of a method for implementing a scheduling system 20. Just as the scheduling system 20 can exist in a wide number of different embodiments, there are also many different ways in which the scheduling system 20 can be implemented. FIG. 9 illustrates one such process.

At 200, a calendar-view interface is configured for the display of job scheduling information. The format of the calendar can be set such that the user 22 can switch between day-views, week-views, month-views, etc. As discussed above, the calendar view 38 of scheduling system 20 can also be hosted by an office workflow system, integrating the scheduling data with potentially enterprise-wide data sharing. In other embodiments, the calendar-view interface 28 is provided by a separate scheduling application 32 that is not integrated with other software applications.

Part of this process can involve creating a color-coded scheme for differentiating certain types of items on the schedule 34, such as a priority value for a job 76, a capacity metric for a build 74 on a machine 40, a utilization metric for a build 74 on a machine 40, a job 76 that will not be completed until after an associated deadline, a job reservation that is not associated with a completed design, or a tentative job reservation.

At 204, a link, such as a data pipe, is established between the calendar view 38 and the underlying data accessed by what would otherwise be a queue-list view 36 of the schedule 34. Some embodiments of the system 20 maintain a structure of one data source with multiple views. In other embodiments, there may be a desire to store data in a slightly different manner, and so some redundancies may be included.

At 206, the computer programming for the scheduling heuristic 56 is incorporated into the system 20. The scheduling application 32 can be configured to automatically create a schedule 34 based on the entry of one or more job characteristics 62.

The scheduling application 32 can be configured to ignore or even prohibit the entry of a priority value that exceeds the authorization of a particular user, an interruption to a job that is currently in process, a disruption to the maintenance schedule of a machine 40, and an advance reservation that is outside a time frame that can be schedule.

B. Method for Using

FIG. 10 is a flow chart illustrating an example of a method for using a scheduling system 20.

At 210, the user 22 views a current schedule 34 in the format of a calendar view 38. Such a view allows the user 22 to review the schedule for more than a single day at a single glance (e.g. in a simultaneous or substantially simultaneous manner) without scrolling the screen, clicking a mouse, or performing any other activities with the interface 26.

At 212, the user 22 submits a new job 76 for scheduling. In some embodiments, the user 22 will submit a suggested start time. In other embodiments, the user 22 may instead submit a deadline for the completion of the job 76. Any of the potential inputs for the scheduling heuristics 56 identified in FIG. 4 can be used at 212. The degree of automation can vary widely from embodiment to embodiment.

In submitting a job 76 for scheduling, either the system 20 and/or the user 22 may be able to associate the new job 76 with an existing build. Information such as a refill period, various other jobs 76, a build tray, a build tray capacity, a job completion time, may already be associated with the existing build. As discussed above, the scheduling heuristics 56 can be configured so that no new builds 74 are scheduled to begin during a period of operator 46 absence.

VIII. Alternative Embodiments

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A scheduling system, comprising:
an interface configured to receive input data and display output data; and
a device providing for generating said output data from said input data;
wherein said interface selectively provides for a queue-list view and a calendar view of said output data;
wherein said input data includes:
a plurality of organization characteristics:
a plurality of machine characteristics, comprising:
a plurality of machine maintenance characteristics including a maintenance frequency and a maintenance duration;
a plurality of machine capacity characteristics including a throughput rate, a build tray capacity, and a raw material capacity; and
a plurality of job characteristics relating to a plurality of jobs, comprising:
a plurality of job input characteristics, including an input type, an input quantity, and a design;
a plurality of job output characteristics including an output type and an output quantity; and
a plurality of job schedule characteristics including a priority value, a deadline, a refill time, a start time, a duration, and a completion time.

2. The system of claim 1, wherein said plurality of machine characteristics relate to a fabrication machine.

3. The system of claim 2, wherein said plurality of job characteristics include a design, and wherein said fabrication machine produces a physical output using said design.

4. The system of claim 1, wherein said interface provides for toggling between said queue-list view and said calendar view.

5. The system of claim 1, wherein said machine capacity characteristic is a build tray capacity, wherein a first color is used on said interface to indicate when said build tray capacity is substantially empty and wherein a second color is used on said interface to indicate when said build tray is substantially full.

6. The system of claim 5, wherein said interface uses a third color to indicate at least one of: a tentative reservation; an unfinished design reservation; a high priority reservation; a low priority reservation; and a maintenance event.

7. The system of claim 1, wherein said input data includes an availability of an operator on at least one of: a weekend; a holiday; an extra shift; and an intra-shift break.

8. The system of claim 1, further comprising a scheduling heuristic and a plurality of jobs described by said plurality of job characteristics, said plurality of jobs including a first job and a second job, at feast one of: (a) a shorter-than-average job and (b) a longer-than-average job, wherein said scheduling heuristic determines a job schedule, wherein said first job is a longer-than-average job and wherein said second job is at least one of: (c) longer in duration than said first job; and (d) a shorter-than average-job.

9. The system of claim 8, wherein said scheduling heuristic provides for at least one of:
automatically scheduling said first job for an overnight period of time;
automatically suggesting the merging said second job with said first job into a single build tray;
automatically suggesting the filling in a block of unscheduled time with a low priority job;
automatically adjusting a build start time to delay a required refill until an operator is scheduled to be available;
automatically adjusting a run rate such that a required refill is delayed until at least one operator is present;
automatically scheduling machine maintenance; and
automatically scheduling a refilling of the machine.

10. The system of claim 1, wherein said interface provides for a drag-drop of a CAD file into an existing reservation.

11. The system of claim 1, wherein said interface automatically creates a warning when a job will not be completed before a deadline associated with said job.

12. The system of claim 11, wherein a reservation is transmitted through said interface before a design associated with said reservation is complete.

13. The system of claim 1, wherein the interface is configured to capture at least one of: a deadline; a priority value; and a user affiliation.

14. The system of claim 1, wherein a present day job schedule can be viewed substantially simultaneously with a future day job schedule without transmitting an instruction to the interface after the present day job schedule is viewed.

15. A system for scheduling jobs on a machine, comprising:
a means for receiving a plurality of input attributes and to display a plurality of output attributes in a calendar-view format;
wherein said input attributes include:
a plurality of job characteristics relating to a plurality of jobs comprising:
a plurality of job input characteristics including an input type, an input quantity and a design;
a plurality of job output characteristics including an output type and an output quantity;
a plurality of job scheduling characteristics including a priority value, a deadline, a refill time, a start time, a duration, and a completion time;
a plurality of machine characteristics comprising:
plurality of machine maintenance characteristics including a maintenance frequency and a maintenance duration; and
a plurality of machine capacity characteristics including a throughout rate, a build tray capacity, and a raw material capacity; and
an organization characteristic;
wherein said output attributes include a start time associated with a job identifier; and
a means for generating a schedule including said output attributes, wherein said output attributes are generated from said input attributes.

16. The system of claim 15, further comprising a means to automatically manufacture a plurality of physical outputs from a plurality of physical inputs in accordance with said schedule.

17. The system of claim 15, further comprising:
a means for producing a physical output from a design and an inputted resource;
a means for making said inputted resource accessible to said means for producing said physical output;
wherein said means for receiving said plurality of Input attributes is further configured to:
transmit said design to said means for producing said physical output;
access availability attributes relating to an operator; and
set at least one of:
a deadline;
a priority value;
a scheduling rule; and
an advance reservation for an unfinished design.

18. A method for implementing a job scheduling application, comprising:
configuring a calendar-view interface for the display of job scheduling information;
adapting the calendar-view interface to automatically access information that can be displayed on a queue-list interface; and
programming a scheduling heuristic to facilitate an automated schedule modification performed on a job input, said scheduling heuristic provides for at least one of:
automatically scheduling said first job for an overnight period of time;
automatically suggesting the merging said second job with said first job into a single build tray;
automatically suggesting the filling in a block of unscheduled time with a low priority job;
automatically adjusting a build start time to delay a required refill until an operator is scheduled to be available;
automatically adjusting a run rate such that a required refill is delayed until at least one operator is present;
automatically scheduling machine maintenance; and
automatically scheduling a refilling of the machine.

19. The method of claim 18, further comprising:
defining a color-coded scheme for displaying at least one of:
a priority value for a job;
a utilization metric for a build on a machine;
a job that will not be completed until after an associated deadline;
a job reservation that is not associated with a completed design;
a indicator, wherein said indicator is at least one of a resource consumption indicator, a status indicator, and an operator intervention indicator; and
a tentative job reservation.

20. The method of claim 18, further comprising:
instructing the job scheduling application to prohibiting the setting of at least one of:
a priority value that exceeds the authorization of a particular user;
an interruption to a job that is currently in process;
a disruption to the maintenance schedule of a machine; and
an advance reservation that is outside a time frame of time that can be scheduled.

21. The method of claim 18, wherein the job scheduling application is hosted by an office workflow system.

22. The method of claim 18, wherein said job scheduling application is in communication with one or more fabrication machines.

* * * * *

UNITED STATES PATENT AND TRADEMARK OFFICE
CERTIFICATE OF CORRECTION

PATENT NO. : 6,983,188 B2 Page 1 of 1
APPLICATION NO. : 10/718826
DATED : January 3, 2006
INVENTOR(S) : Loughran et al.

It is certified that error appears in the above-identified patent and that said Letters Patent is hereby corrected as shown below:

Col. 22 (line 29), delete "feast" and insert therefor --least--.

Col. 23 (line 17), before "plurality", insert --a--.

Col. 23 (line 38), delete "Input" and insert therefor --input--.

Signed and Sealed this

Twelfth Day of December, 2006

JON W. DUDAS
*Director of the United States Patent and Trademark Office*